(12) United States Patent
Reinprecht et al.

(10) Patent No.: US 9,908,457 B2
(45) Date of Patent: Mar. 6, 2018

(54) LIGHTING SYSTEM FOR MOTOR VEHICLES

(71) Applicant: ZIZALA LICHTSYSTEME GMBH, Wieselburg (AT)

(72) Inventors: Markus Reinprecht, Wieselburg (AT); Stefan Miedler, Unterrandlberg (AT); Gerald Böhm, Ybbs (AT); Adolf Teufl, Amstetten (AT); Thomas Edletzberger, Loosdorf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 0 days.

(21) Appl. No.: 14/889,503

(22) PCT Filed: Apr. 30, 2014

(86) PCT No.: PCT/AT2014/050111
§ 371 (c)(1),
(2) Date: Nov. 6, 2015

(87) PCT Pub. No.: WO2014/179824
PCT Pub. Date: Nov. 13, 2014

(65) Prior Publication Data
US 2016/0107563 A1 Apr. 21, 2016

(30) Foreign Application Priority Data
May 8, 2013 (AT) .............. A 50313/2013

(51) Int. Cl.
*F21V 9/00* (2015.01)
*B60Q 1/00* (2006.01)
(Continued)

(52) U.S. Cl.
CPC .......... *B60Q 1/0011* (2013.01); *B60Q 1/0052* (2013.01); *B60Q 1/04* (2013.01);
(Continued)

(58) Field of Classification Search
CPC ...... B60Q 1/0011; B60Q 1/0052; B60Q 1/04; F21S 48/115; F21S 48/1163;
(Continued)

(56) References Cited

U.S. PATENT DOCUMENTS 7,794,125 B2 * 9/2010 Offermann ........ B32B 17/10036
362/490
2009/0262545 A1 * 10/2009 Amelung ................ B60Q 1/34
362/487

(Continued)

FOREIGN PATENT DOCUMENTS

DE 29920487 U1 2/2000
DE 102004004398 A1 12/2004
(Continued)

*Primary Examiner* — Elmito Breval
*Assistant Examiner* — Jessica M Apenteng
(74) *Attorney, Agent, or Firm* — Eversheds Sutherland (US) LLP

(57) ABSTRACT

A lighting device for motor vehicles comprising an optical waveguide element (14) that has a light entrance surface (16) and a light exit surface (15) and that has an electric light-emitting layer (19) on at least part of at least one surface of the optical waveguide element. The light-emitting layer is advantageously in the form of an OLED layer.

8 Claims, 2 Drawing Sheets

(51) Int. Cl.
  *F21S 8/10* (2006.01)
  *B60Q 1/04* (2006.01)
  *F21Y 105/00* (2016.01)
  *F21Y 115/20* (2016.01)

(52) U.S. Cl.
  CPC ......... *F21S 48/115* (2013.01); *F21S 48/1163* (2013.01); *F21S 48/1241* (2013.01); *F21S 48/215* (2013.01); *F21S 48/217* (2013.01); *F21S 48/2243* (2013.01); *F21S 48/2262* (2013.01); *F21S 48/2281* (2013.01); *F21S 48/2293* (2013.01); *F21Y 2105/00* (2013.01); *F21Y 2115/20* (2016.08)

(58) Field of Classification Search
  CPC .... F21S 48/215; F21S 48/217; F21S 48/2243; F21S 48/2293; F21S 48/2262
  USPC ........................................................ 362/511
  See application file for complete search history.

(56) References Cited

U.S. PATENT DOCUMENTS

| | | | |
|---|---|---|---|
| 2013/0003399 A1* | 1/2013 | de Lamberterie | F21S 48/115 362/511 |
| 2013/0027956 A1* | 1/2013 | Dubosc | F21S 48/115 362/511 |

FOREIGN PATENT DOCUMENTS

| | | |
|---|---|---|
| DE | 102007021865 A1 | 11/2008 |
| EP | 2541128 A2 | 1/2013 |
| FR | 2957133 A1 | 9/2011 |
| JP | 2010176982 A | 8/2010 |
| KR | 20110058120 A | 6/2011 |
| WO | 2013027170 A2 | 2/2013 |

* cited by examiner

LIGHTING SYSTEM FOR MOTOR VEHICLES

The invention relates to a lighting device for motor vehicles comprising an optical waveguide element that has a light entrance surface and a light exit surface.

Lighting devices of this type are used in many ways today in motor vehicles, for example such optical waveguide elements are arranged around the exit openings of headlights, light coming from light-emitting diodes, for example, being irradiated into the light entrance surface and emitted forward. In addition to the actual lighting function, in many cases design motives are also essential for the form and the geometry of such optical waveguide elements. In addition to use in the area of headlights, such lighting devices are also [used] for interior lighting or are arranged on the side or back of motor vehicles. Solutions are known in which side surfaces of the optical waveguide element are given an irregular structure, so that the light irradiated into the light entrance surface is scattered at the irregular structures and also emitted to the sides.

For example, DE 10 2010 054 923 A1 shows a lighting device of this type in connection with a headlight, while DE 10 2011 050 422 A1 discloses a similar application in a motor vehicle tail light.

One goal of the invention is to create a lighting device of the type that is the subject of the invention that allows light to be emitted not only from the light exit surface but rather also from the sides. On the one hand, this should not require the optical waveguide element to have an elaborate structure, and on the other hand it should allow great flexibility with respect to the emitted light's quality (intensity, color).

To accomplish this, the invention provides that an electric light-emitting layer is provided on at least part of at least one surface of the optical waveguide element.

The inventive lighting device really does make it simple to provide an observer with depth perception or 3-D effects for which the prior art required elaborate combinations and structures of optical waveguides. It can also realize several lighting functions with geometry that appears the same to an observer.

Such light-emitting layers, which can be in the form of so-called "OLED" layers, for example, allow lighting in different colors, and their manufacturing presents no technical problems, since they can be made very thin.

Here it should be mentioned that the use of OLED layers in connection with motor vehicle lighting was disclosed in DE 10 2009 009 087 A1, which shows a lighting device for a motor vehicle in which a thin, planar organic light-emitting diode (OLED) is arranged in front of a reflector for a first light source, covering the reflector, allowing, for example the lighting functions of a rear fog light and a tail light to be superimposed.

As has already been mentioned, an advantageous embodiment provides that the light-emitting layer be in the form of an OLED layer, but it is also possible for the light-emitting layer to be in the form of an electroluminescence layer, for example.

An advantageous embodiment provides a bar-shaped optical waveguide that has at least one input point for the light of at least one light source and, along at least part of its length, an arrangement of irregular structures and a light exit surface opposite it, the light entrance surface of the optical waveguide element being connected to the light exit surface of the bar-shaped optical waveguide through means provided by lighting engineering. The use of such a bar-shaped optical waveguide, which is very well known in motor vehicle lighting engineering (e.g., AT 503 926 B1), produces good illumination that can even come from only a single light source sitting at the input point, light-emitting diodes being especially suitable light sources.

It can further be provided that the optical waveguide element is in the form of a hollow cylinder, the two end surfaces of the cylinder wall forming the light entrance and exit surfaces. Such geometry can be flexibly used, for example, in connection with front lights in motor vehicles. In particular, it can be provided that the cylinder wall surrounds at least sections of the light exit opening of a headlight module.

It is further expedient for the geometry of the bar-shaped optical waveguide to be adapted to the light entrance surface of the optical waveguide element, to avoid light losses and simplify the design.

On the other hand, it is also possible for the light entrance surface of the optical waveguide element to have individual light sources that feed light directly into the optical waveguide element. In some cases, a single or only a few light sources can suffice to ensure satisfactory light emission.

It is generally preferred for the optical waveguide element to consist of a transparent material. This keeps light losses small, and avoids unnecessary warming of the optical waveguide element. However, this does not make it impossible to drop the transparency requirement in certain cases and use an opaque material, if special light effects are desired.

Another variant is characterized in that an electric light-emitting layer is provided on the light entrance surface of the optical waveguide element. Such a light-emitting layer on the light entrance surface can be used instead of the above-mentioned bar-shaped optical waveguide element or instead of discrete individual light sources.

Especially when the optical waveguide element is in the form of a hollow cylinder, in many cases it is esthetically especially satisfying for an electric light-emitting layer to be provided on the outside surfaces of the hollow cylinder.

Other esthetic impressions result if the electric light-emitting layer is transparent.

The invention, along with further advantages, is explained in detail below using sample embodiments that are illustrated in the drawing. The figures are as follows.

Figure 1:
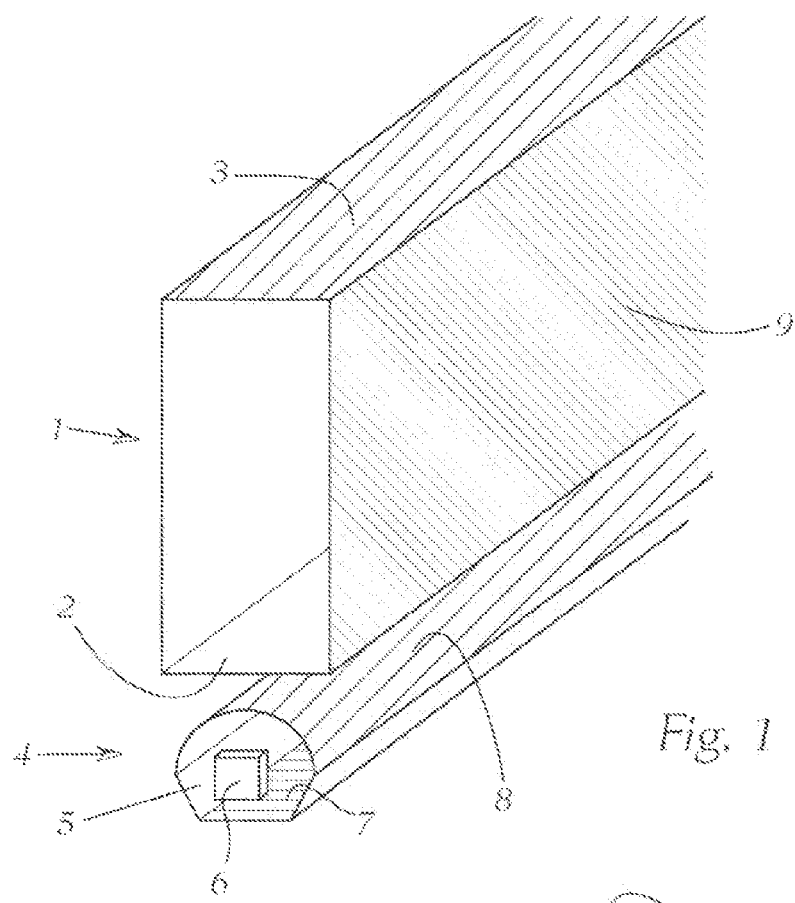
FIG. 1 shows the basic structure of an inventive lighting device, together with a bar-shaped optical waveguide in partial and perspective view.

FIG. 1 shows an optical waveguide element 1 having the shape of a rectangular cuboid that is advantageously made of a completely transparent material, especially plastic, and that has a light entrance surface 2 and a light exit surface 3. The optical waveguide element 1, which could also be referred to as a thick-walled optical system, is associated with a bar-shaped optical waveguide 4 that has a light input point, here an end face 5, where an LED element 6 is provided as a light source in this case. Here optical waveguide 4 has, on a flat bottom surface, an arrangement of irregularities 7, and opposite this it has a light exit surface that in this case has a somewhat cylindrical shape, however could just as well be flat or have another shape. Optical waveguides of this type are known, the light input from the light source 6, here an LED element, being reflected along the optical waveguide 4 and the arrangement of irregularities 7, e.g., an array of small prisms, emitting it outward through the light exit surface 8.

It can be seen that the light exiting from the light exit surface 8 enters the entrance surface 2 of the rectangular cuboid shaped optical waveguide element 1 and exits mainly on the opposite light exit surface 3 for lighting purposes, it being possible for the arrangement to be used, for example, for marker lights in a motor vehicle. In the example shown in FIG. 1, both the optical waveguide 4 and also the optical waveguide element 1 are straight for simplicity, but it should be clear that the optical waveguide can be curved in any way, the curvature of the optical waveguide element 1 and the optical waveguide 4 generally being adapted to one another. The light also need not be input into the optical waveguide 4 at only a single position, as it is here in this case at end face 5, but rather can be input at both faces of the optical waveguide, for example, or additionally at branches opening into the optical waveguide.

To create an additional source of lighting, in FIG. 1 an electric light-emitting layer 9 is applied to only one side surface, here the one on the right in the picture. It is advantageous for such a light-emitting layer to be in the form of an OLED layer. This is understood to be an organic light-emitting diode, which is a luminous thin film component made of organic semiconductor materials that can, when a voltage is applied, emit light of various colors, depending on its composition. This OLED layer can also be transparent, that is, it can allow light to pass through it.

Even though only one side surface in the example in FIG. 1 has an electric light-emitting layer, it should be clear that the optical waveguide element's other surfaces, in whole or in part, could also have such a light-emitting layer.

The light source can be provided by a light-emitting layer on the light entrance surface 2, instead of by optical waveguide 4. In addition, side surfaces of the optical waveguide element can have similar or other light-emitting layers, the choice of the color and/or intensity of the light emitted by the respective light-emitting layers being adapted to the corresponding requirements.

It should be noted that in the context of the invention light-emitting layers need not necessarily be in the form of OLED layers, but rather can also be provided in the form of electroluminescence layers. Electroluminescence films are commercially available and emit light when alternating voltage is applied. They can also be transparent.

Figure 2:
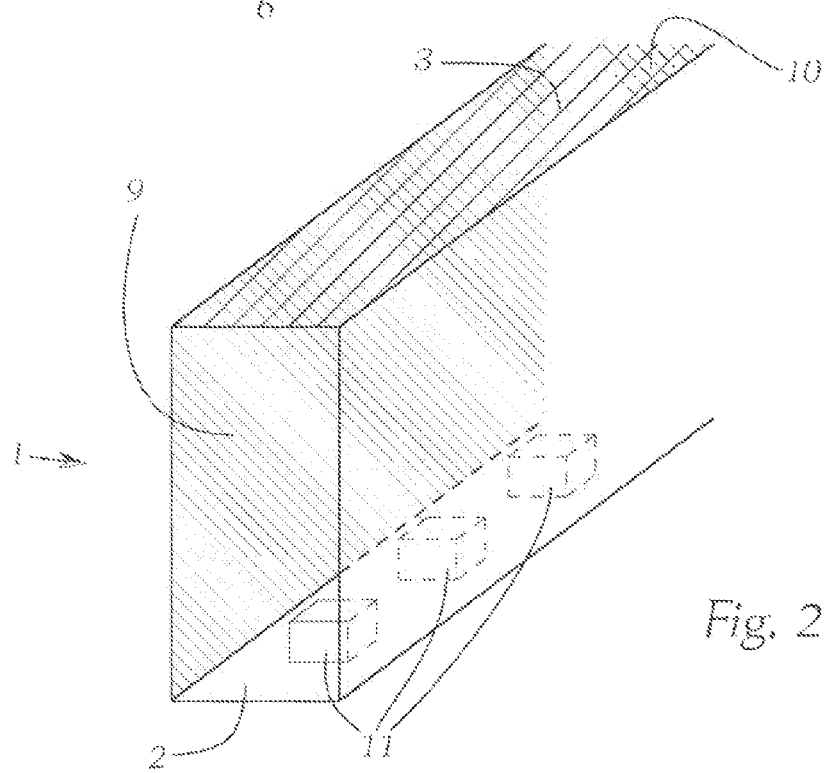
FIG. 2 shows a variant in which individual light sources are provided instead of a bar-shaped optical waveguide.

FIG. 2 once again shows an inventive lighting device that is the same as that in FIG. 1 in that it has a rectangular cuboid-shaped optical waveguide element 1 with a light entrance surface 2 and a light exit surface 3. In this case, optical waveguide element 1 has an electric light-emitting layer 9 on its longitudinal surface that is on the left in the picture, and it is indicated that light exit surface 3 can also have another an electric light-emitting layer 10 on it, which in this case absolutely must be designed to be transparent.

In contrast to FIG. 1, here optical waveguide element 1 has three individual LED elements 11 arranged on its light entrance surface 2 as light sources, whose light passes through optical waveguide element 1 and exits at light exit surface 3 for lighting purposes. Depending on the geometry and design of optical waveguide element 1, part of the light input at light entrance surface 2 can also exit at side surfaces.

Figure 3:
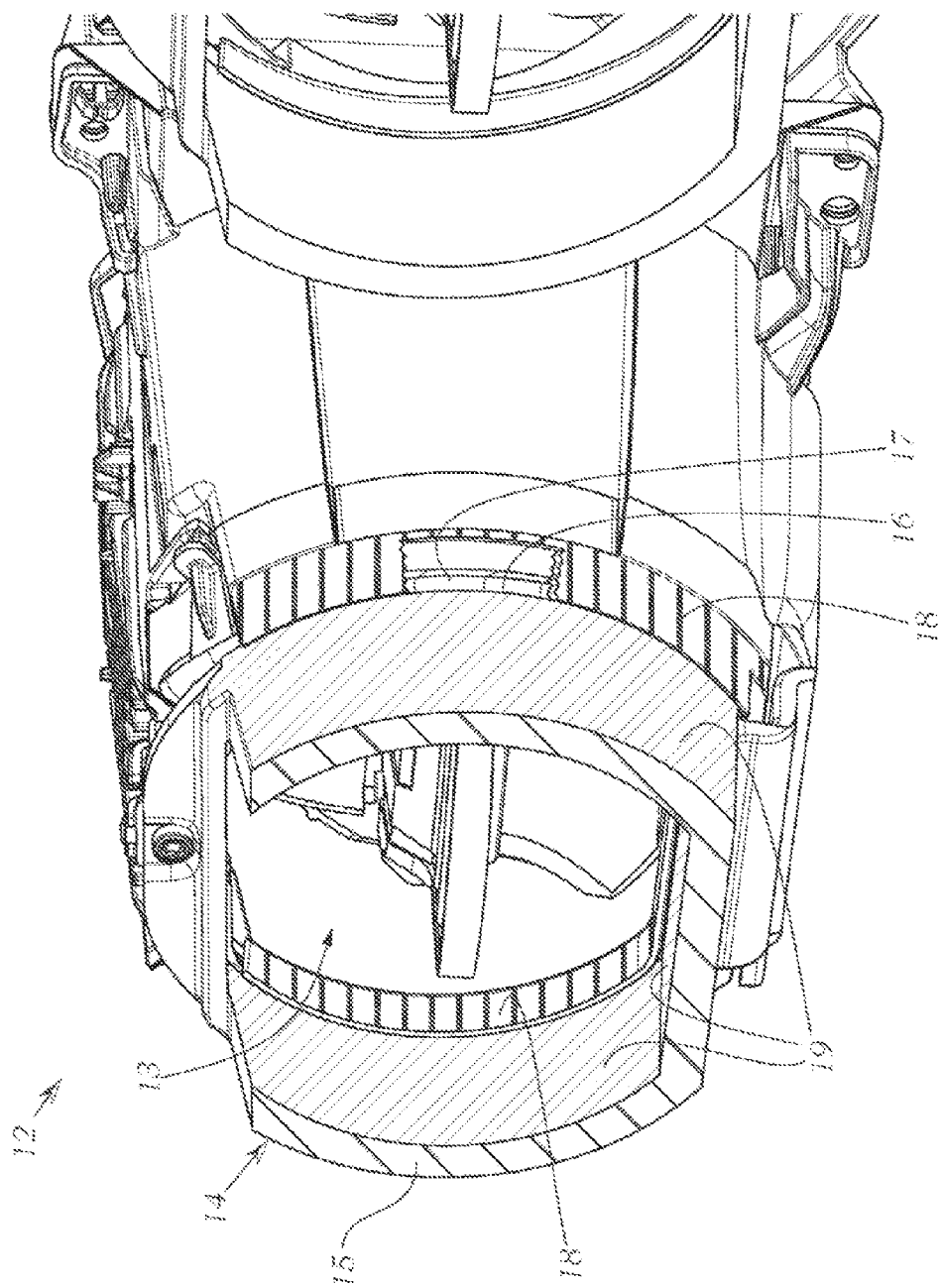
FIG. 3 shows a variant in which the optical waveguide element is in the form of a hollow cylinder and surrounds the light exit surface of a headlight module, also in partial and perspective view.

FIG. 3 shows a more complex embodiment of an inventive lighting device combined with a headlight 12. This headlight module 12 can be used to produce conventional low beam light, for example, and has a light exit opening 13. This opening 13 is surrounded over most of its perimeter by an optical waveguide element 14 in the form of a hollow cylinder with a planar, forward-facing light exit surface 15. Of course the term "forward-facing" should be understood in the sense of light emission, and does not necessarily mean "in the direction of travel of a vehicle". Opposite light exit surface 15, optical waveguide element 14 has a light entrance surface 16 into which the light of an optical waveguide 17 is input. The geometry of this optical waveguide 17 corresponds to the shape of optical waveguide element 14, i.e., it also surrounds the light exit opening 13 of headlight module 12 and in theory it can have a similar shape, as does the optical waveguide 4 shown in FIG. 1, however it is bent, in contrast to it. Light can be input at both ends of optical waveguide 17, e.g., by LED elements, however this cannot be seen in the drawing. Only a small section of optical waveguide 17 can be seen in FIG. 3, since in the sample embodiment shown this optical waveguide is surrounded by a covering 18.

In the sample embodiment shown, the inside and outside surfaces of hollow cylindrical optical waveguide element 14 have electric light-emitting layers 19. Thus, the headlight module 12 equipped with an inventive lighting device has at least three lighting functions, namely the mentioned low beam headlight function, for example, which comes from the headlight module itself and from a light source (not shown) arranged inside module 12; the light of optical waveguide 17 that is emitted forward through optical waveguide element 14; and third the light coming from the electric light-emitting layers 19. It goes without saying that in addition to the purely technical lighting functions, the invention also makes it possible to achieve special esthetic effects that meet corresponding design requirements. Here again, the light emitted through optical waveguide 17 need not necessarily come from an optical waveguide, but rather it is also possible in this case for there to be individual light sources or an electric light-emitting layer arranged on the light entrance surface 16 of an optical element 14.

The drawings do not show the means of electrical connection required to supply power to the individual light sources, or their sources of current and/or voltage, but the person skilled in the art has the information about these things that is relevant for implementing them. It should also be mentioned that the electric light-emitting layers, e.g., OLED layers, need not by any means cover the entire surface [where they are placed], but rather can also be in the form of strips or other structures in certain cases. The use of electric light-emitting layers in the inventive lighting device also offers the special advantage that there are almost no limitations on the geometry of the optical waveguide element. The surfaces to which the light-emitting layers are adapted are, as a matter of fact, freely definable and of course need not be planar, which follows, for example, from the sample embodiment in FIG. 3.

LIST OF REFERENCE NUMBERS

1 Optical waveguide element having the shape of a rectangular cuboid
2 Light entrance surface
3 Light exit surface
4 Optical waveguide
5 End face
6 LED element
7 Arrangement of irregular structures
8 Light exit surface
9 Electric light-emitting layer
10 Light-emitting layer, other 11 LED elements
12 Headlight module
13 Light exit opening
14 Optical waveguide element
15 Light exit surface
16 Light entrance surface
17 Optical waveguide
18 Covering
19 Light-emitting layers, electric

The invention claimed is:

1. A lighting device for a headlight module (12) of a motor vehicle, comprising:
   a light exit opening (13) for the headlight module (12);
   an optical waveguide element (14) in the form of a hollow cylinder surrounding at least a portion of a perimeter of the light exit opening (13) for the headlight module (12), wherein the optical waveguide element (14) includes a light entrance surface (16) on a rear-facing end and a light exit surface (15) on a forward-facing end;
   an electric light-emitting layer (19) disposed on at least part of at least one inner or outer surface of the optical waveguide element (14); and
   an optical waveguide (17) having a geometry that corresponds to the optical waveguide element (14), wherein the optical waveguide (17) includes at least one input point (5) for light from at least one light source (6), wherein the optical waveguide (17) is bar-shaped and has, along at least part of its length, an arrangement of irregular structures (7) and a light exit surface (8) opposite the arrangement of irregular structures (7), the light entrance surface (16) of the optical waveguide element (14) being connected to the light exit surface (8) of the optical waveguide (17).

2. The lighting device of claim 1, wherein the light-emitting layer (19) is in the form of an OLED layer.

3. The lighting device of claim 1, wherein the light-emitting layer (19) is in the form of an electroluminescence layer.

4. The lighting device of claim 1, wherein the geometry of the optical waveguide (17) is adapted to the light entrance surface (16) of the optical waveguide element (14).

5. The lighting device of claim 1, wherein the optical waveguide element (14) comprises a transparent material.

6. The lighting device of claim 1, wherein an electric light-emitting layer is provided on the light entrance surface (16) of the optical waveguide element (14).

7. The lighting device of claim 1, wherein the electric light-emitting layer (19) is provided on the outer surface of the optical waveguide element (14).

8. The lighting device of claim 1, wherein the electric light-emitting layer (19) is transparent.

* * * * *